United States Patent Office 2,806,016
Patented Sept. 10, 1957

2,806,016

POLYGLYCIDYL ETHERS OF TETRAPHENOLS

Carl G. Schwarzer, Walnut Creek, Calif., assignor to Shell Development Company, New York, N. Y., a corporation of Delaware No Drawing. Application November 1, 1954, Serial No. 466,208

6 Claims. (Cl. 260—47)

This invention relates to a new class of epoxy resins. More particularly, the invention is concerned with new and useful polyglycidyl ethers of a special class of tetraphenols.

Epoxy resins known heretofore have largely been polyglycidyl ethers of a dihydric phenol such as bis-phenol or 2,2-bis-(4-hydroxyphenyl)propane. Although the cured products of these epoxy resins are hard and strong at normal atmospheric temperatures, the hardness and strength of the products are much less at elevated temperatures. Consequently, the usual epoxy resins are not very suitable in applications wherein the cured product is subjected to conditions of elevated temperatures. It is therefore a principal object of the present invention to provide new epoxy resins which overcome the shortcomings of the prior resins. This and other objects which will be apparent are achieved by the present invention.

The new epoxy resins of my invention are polyglycidyl ethers of alpha,alpha,omega,omega-tetrakis(hydroxyaryl)alkanes. I discovered that my new epoxy resins when cured are unusual in retaining excellent hardness and good strength at quite elevated temperatures. These valuable properties make the new class of epoxy resins very useful in a variety of applications such as laminating, surface coatings and moldings.

The new polyglycidyl ethers of the invention are derived from a tetraphenol which has two hydroxyaryl groups at each end of an aliphatic hydrocarbon chain which may be substituted if desired. The polyglycidyl ethers are obtained by reacting a mixture of the tetraphenol and epichlorohydrin or glycerol dichlorohydrin with an alkali metal hydroxide as more fully explained hereinafter. A variety of tetraphenols are used in preparing the polyglycidyl ethers although it is preferred to employ an alpha,alpha,omega,omega-tetrakis(hydroxyphenyl)alkane as is the case with such representative compounds as 1,1,2,2-tetrakis(hydroxyphenyl)ethane; 1,1,3,3-tetrakis-(hydroxyphenyl)propane; 1,1,4,4-tetrakis(hydroxyphenyl)butane; 1,1,5,5-tetrakis(hydroxyphenyl)-3-methylpentane; 1,1,4,4-tetrakis(hydroxyphenyl)-2-ethylbutane; 1,1,-8,8-tetrakis(hydroxyphenyl)octane; 1,1,10,10-tetrakis(hydroxyphenyl)decane and the like as well as corresponding compounds containing neutral substituent groups in the chain as with 1,1,3,3-tetrakis(hydroxyphenyl)-2-chloropropane; 1,1,3,3-tetrakis(hydroxyphenyl)-2-nitropropane; 1,1,4,4-tetrakis(hydroxyphenyl)-2,3-dibromobutane; 1,1,6,6-tetrakis(hydroxyphenyl)hexanol-2, etc. Besides including polyglycidyl ethers of the foregoing phenols, the invention also encompasses polyglycidyl ethers of similar tetraphenols having substituted hydroxyphenyl groups therein as well as polynuclear hydroxyaryl groups. Reference is made to polyglycidyl ethers of such typical compounds as 1,1,2,2-tetrakis(2-hydroxy-5-methylphenyl)-ethane; 1,1,3,3-tetrakis(4-hydroxy-2,6-ditertiarybutylphenyl)propane; 1,1,6,6-tetrakis(3-chloro-4-hydroxyphenyl)-hexane; 1,1,4,4-tetrakis-(2-hydroxynaphthyl)butane and the like.

The tetraphenols used in preparing the polyglycidyl ethers are a known class of compounds readily obtained by condensing the appropriate dialdehyde with the desired phenol. This condensation is effected by mixing the phenol and the dialdehyde together using a substantial excess of the phenol over the stoichiometric proportions of four moles of the phenol per mole of dialdehyde, saturating the mixture with hydrogen chloride, allowing the mixture to react for several days, and removing the unreacted phenol as by distillation, for example. The phenols condense with the dialdehydes so that the terminal carbon atom is linked to a nuclear carbon atom of the phenol, which nuclear atom is normally in a position from the class consisting of 2 and 4 with respect to the phenolic hydroxyl group.

The polyglycidyl ethers of the invention may be prepared by adding the tetraphenol to epichlorohydrin using the latter in a ratio of about 2 to 10 molecules of epichlorohydrin per phenolic hydroxyl group of the phenol, and then adding an alkali metal hydroxide such as sodium or potassium hydroxide so as to effect the desired etherification reaction. It is convenient to dissolve the tetraphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonably rapid rate. The sodium hydroxide is added in amount that is equivalent on stoichiometric basis to the quantity of starting tetraphenol, or a small excess thereof such as 3% to 5%. Upon completion of the caustic addition and the etherification reactions, unreacted epichlorohydrin is separated by distillation. The residue consisting primarily of the polyglycidyl ether and salt has added thereto a mixture of equal volumes of toluene and butanone. This solvent mixture dissolves the ether, but not the salt which is removed by filtration. The filtrate is then distilled to separate the solvent and leave the desired polyglycidyl ether.

The polyglycidyl ether of the tetraphenol of the invention is a solid epoxy resin at 25° C., and has more than one of the hydrogen atoms of the phenolic hydroxyl groups of the tetraphenol replaced by a glycidyl radical in the average molecule. Usually, the average molecule contains about 3 to 4 glycidyl radicals. Other groups in the ether besides a possible very small amount of unetherified phenolic hydroxyl groups, are dihydroxy glyceryl radicals and chlorohydroxy radicals which likewise are substituted in place of hydrogen atoms of phenolic hydroxyl groups of the initial tetraphenol. The polyglycidyl ether of the invention is soluble in lower aliphatic ketones as well as in mixtures of an aromatic hydrocarbon containing a substantial proportion of such lower ketone.

As stated hereinbefore, the new epoxy resins of the invention are very useful materials. They undergo cure by heating to hard, temperature-resistant products after addition thereto of customary epoxy resin curing agents such as dicyandiamide, mono- or polyamines, polycarboxylic acids or anhydrides, etc. In using the polyglycidyl ethers in various applications, they may be mixed with one or more of a variety of other materials such as fillers, solvents including monoepoxy compounds, pigments, plasticizers, and different resins such as phenolic resins, urea resins and melamine resins.

The invention is illustrated in the following examples, but it is not to be construed as limited to details described therein. The parts and percentages are by weight.

*Example 1*

The polyglycidyl ether of 1,1,2,2-tetrakis(hydroxyphenyl)-ethane was prepared by reaction of epichlorohydrin with the tetraphenol. Into a reaction vessel fitted with a heater, stirrer and reflux condenser having a separating head, a solution of 173 parts of the tetraphenol in 1610 parts of epichlorohydrin was charged and heated to about 105° C. A solution containing 70 parts of sodium hydroxide in 82 parts of water was added gradually at such a rate as to keep the reflux temperature between about 103 and 107° C. During the addition of caustic, water was distilled azeotropically with epichlorohydrin. The condensed distillate was allowed to separate continuously into two layers, and the lower epichlorohydrin layer was returned to the kettle. After addition of all the caustic, the system was azeotroped to dryness at a kettle temperature of about 116° C., and excess epichlorohydrin was distilled off as rapidly as possible until the kettle temperature reached about 126° C. About 110 parts of aqueous layer was collected. About 170 parts of a mixture of equal volumes of toluene and butanone was added to the residual reaction product, and the formed salt was filtered out. The filtrate was then distilled to remove solvents up to a temperature of about 155° C. at 5 mm. Hg pressure. The resulting polyglycidyl ether obtained in yield of 77% melted at about 85° C., and contained 0.452 epoxy equivalents per 100 grams.

A glass cloth laminate was prepared using the polyglycidyl ether. An acetone solution containing 60% of the ether was prepared. A catalyst solution prepared by dissolving 16.7 parts of dicyandiamide in 33.3 parts of water and 50.0 parts of acetone was added to the ether solution so there was present an added 4% of dicyandiamide based upon the ether. A strip of 181 Volan A glass cloth was passed through the solution and dried for 10 minutes at about 90° C. The strip was cut in pieces and six plies were stacked together. The assembly was encased in cellophane and placed in a heated press having a temperature of about 175° C. The press platens were brought into contact pressure of about 3 p. s. i. (pounds per square inch) for 1 minute, and then the pressure was increased to 25 p. s. i. for 9 minutes. The product was a strong laminate having a Barcol hardness at 25° C. of 71 and at 150° C. of 55.

By way of comparison, a similar six ply glass cloth laminate was prepared using a normally solid polyglycidyl ether of 2,2-bis(4-hydroxyphenyl)propane (EPON 1001 manufactured by Shell Chemical Corporation). The laminate was prepared in like manner to the above using an added 4% of dicyandiamide based upon the ether as curing agent. This laminate had a Barcol hardness of 66 at 25° C., but only a hardness of 3 at 150° C.

The tetraphenol used in preparing the polyglycidyl ether was obtained in a manner typical for preparation of the polyphenols by reaction of the dialdehyde with the phenol. About 1356 parts of phenol and 101 parts of an aqueous solution containing 30.2% of glyoxal was charged to a reaction vessel. The mixture was warmed to dissolve the phenol and then cooled to room temperature of about 25° C. The mixture was saturated with dry hydrogen chloride and allowed to stand for about 3 days. The reaction mixture was then distilled to remove volatiles with heating up to a temperature of about 180° C. under 1.5 mm. Hg pressure. The residue was the solid tetraphenol having a measured molecular weight of 372, and a hydroxyl value of 1.01 hydroxyl equivalents per 100 grams (theory=1.005).

*Example 2*

The polyglycidyl ether of 1,1,3,3-tetrakis(hydroxyphenyl)-propane was prepared by the same procedure described in Example 1 with use of 200 parts of the tetraphenol dissolved in 1274 parts of epichlorohydrin and a solution of 76 parts of sodium hydroxide in 89 parts of water. An 86% yield of the desired polyglycidyl ether was obtained. It was a solid product having an epoxy value of 0.522 epoxy equivalents per 100 grams.

A glass cloth laminate was prepared as described in Example 1 except that this polyglycidyl ether was used. The resulting laminate also retained excellent hardness at elevated temperature in that the Barcol hardness was 72 at 25° C., and 55 at 150° C.

*Example 3*

The polyglycidyl ether of 1,1,5,5-tetrakis(hydroxyphenyl)pentane was prepared by the method described in Example 1 using 477 parts of the tetraphenol dissolved in 2674 parts of epichlorohydrin which was treated with an aqueous solution of 166 parts of sodium hydroxide in 196 parts of water. A 62% of solid polyether was obtained having an epoxy value of 0.514 epoxy equivalents per 100 grams.

As described in Example 1, a glass cloth laminate was prepared using the polyglycidyl ether. The Barcol hardness of the laminate was 72 to 25° C. and 54 at 150° C.

*Example 4*

The polyglycidyl ether of 1,1,6,6-tetrakis(hydroxyphenyl)hexanol-2 was prepared according to the method described in Example 1 using 189 parts of the tetraphenol dissolved in 1050 parts of epichlorohydrin and an aqueous solution of 65 parts of sodium hydroxide in 76 parts of water. The solid polyglycidyl ether was obtained in 78% yield and had an epoxy value of 0.442 epoxy equivalents per 100 grams.

Upon making a glass cloth laminate from the ether as described in Example 1, it was found the laminate had Barcol hardness of 73 at 25° C. and a hardness of 59 at 150° C.

I claim as my invention:

1. A polyglycidyl ether of an alpha,alpha,omega,omega-tetrakis(hydroxyaryl)alkane wherein the alkane chain contains at least 2 carbon atoms.
2. A polyglycidyl ether of an alpha,alpha,omega,omega-tetrakis(hydroxyphenyl)alkane wherein the alkane chain contains at least 2 carbon atoms.
3. A polyglycidyl ether of 1,1,2,2-tetrakis(hydroxyaryl)ethane.
4. Polyglycidyl ether of 1,1,2,2-tetrakis(hydroxyphenyl)ethane.
5. Polyglycidyl ether of 1,1,3,3-tetrakis(hydroxyphenyl)propane.
6. Polyglycidyl ether of 1,1,5,5-tetrakis(hydroxyphenyl)pentane.

References Cited in the file of this patent

UNITED STATES PATENTS

| | | |
|---|---|---|
| 2,333,548 | Niederl | Nov. 2, 1943 |
| 2,592,560 | Greenlee | Apr. 15, 1952 |